United States Patent
Maruyama et al.

(10) Patent No.: US 11,693,510 B2
(45) Date of Patent: *Jul. 4, 2023

(54) TOUCH PANEL SYSTEM AND DISPLAY DEVICE

(71) Applicant: Sharp Display Technology Corporation, Kameyama (JP)

(72) Inventors: Takenori Maruyama, Kameyama (JP); Kazutoshi Kida, Kameyama (JP); Shinji Yamagishi, Kameyama (JP); Takuma Yamamoto, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/722,155

(22) Filed: Apr. 15, 2022

(65) Prior Publication Data

US 2022/0342540 A1 Oct. 27, 2022

(30) Foreign Application Priority Data

Apr. 21, 2021 (JP) .............................. JP2021-071772

(51) Int. Cl.
*G06F 3/041* (2006.01)
*G06F 3/044* (2006.01)

(52) U.S. Cl.
CPC ...... *G06F 3/041662* (2019.05); *G06F 3/0412* (2013.01); *G06F 3/0414* (2013.01); *G06F 3/0445* (2019.05); *G06F 2203/04105* (2013.01)

(58) Field of Classification Search
CPC ............ G06F 3/041662; G06F 3/0412; G06F 3/0414; G06F 3/0445; G06F 2203/04105; G06F 3/0446; G06F 2203/04107; G06F 2203/04112
See application file for complete search history.

(56) References Cited

U.S. PATENT DOCUMENTS

| | | | |
|---|---|---|---|
| 9,619,068 | B2 | 4/2017 | Kim et al. |
| 2014/0292699 | A1 | 10/2014 | Ando |
| 2015/0212633 | A1 | 7/2015 | Yamagishi et al. |
| 2016/0291729 | A1 | 10/2016 | Schardt et al. |
| 2016/0357331 | A1 | 12/2016 | Kano et al. |
| 2017/0052074 | A1 | 2/2017 | Watazu et al. |

(Continued)

FOREIGN PATENT DOCUMENTS

JP 2014-179035 A 9/2014

*Primary Examiner* — Temesghen Ghebretinsae
*Assistant Examiner* — Ivelisse Martinez Quiles
(74) *Attorney, Agent, or Firm* — ScienBiziP, P.C.

(57) ABSTRACT

A touch panel system includes a touch panel including a drive electrode, a position detection electrode, and a pressing detection electrode, and a controller configured to impart a drive signal to the drive electrode and acquire signal values from each of the position detection electrode and the pressing detection electrode. The controller detects a position of an indicator on the basis of the signal values obtained from the position detection electrode and calculates a magnitude of pressing of the indicator on the basis of signal values in a pressing detection range corresponding to the detected position of the indicator among the signal values obtained from the pressing detection electrode.

8 Claims, 15 Drawing Sheets

(56) References Cited

U.S. PATENT DOCUMENTS

| | | |
|---|---|---|
| 2017/0068368 A1 | 3/2017 | Hsiao et al. |
| 2017/0115768 A1* | 4/2017 | Shih ..................... G06F 3/0412 |
| 2018/0067601 A1 | 3/2018 | Winokur et al. |
| 2019/0102030 A1* | 4/2019 | Kakinoki .............. G06F 3/0446 |
| 2019/0339313 A1 | 11/2019 | Vandermeijden |
| 2020/0133455 A1 | 4/2020 | Sepehr et al. |
| 2021/0141488 A1* | 5/2021 | Mugiraneza .......... G06F 3/0448 |
| 2022/0129114 A1* | 4/2022 | Yamagishi ............ G06F 3/0445 |
| 2022/0155901 A1 | 5/2022 | Osawa et al. |
| 2022/0164060 A1* | 5/2022 | Yamamoto ............ G06F 3/0446 |

\* cited by examiner

TOUCH PANEL SYSTEM AND DISPLAY DEVICE

CROSS-REFERENCE TO RELATED APPLICATIONS

This application claims the benefit of priority to Japanese Patent Application Number 2021-071772 filed on Apr. 21, 2021. The entire contents of the above-identified application are hereby incorporated by reference.

BACKGROUND

Technical Field

The present disclosure relates to a touch panel system that detects the position and magnitude of pressing of an indicator, such as a finger or a touch pen, and relates to a display device including the touch panel system.

In recent years, mutual-capacitive touch panels have come into wide use. A mutual-capacitive touch panel includes a drive electrode to which a drive signal is input and a detection electrode. In this touch panel, an indicator is capacitively coupled to each of the drive electrode and the detection electrode, and thus electrostatic capacitance between both the electrodes decreases, and a signal of the detection electrode changes. The position of the indicator is detected on the basis of a change in the signal of the detection electrode.

For example, JP 2014-179035 A proposes a touch panel system that reduces the influence of noise to detect the position of an indicator with high accuracy by integrating (cumulatively adding) a difference value between signals obtained from two types of detection electrodes, namely, a main sensor and a sub-sensor.

SUMMARY

In a touch panel having a configuration capable of detecting the position and magnitude of pressing of an indicator, electrodes for detecting the position and magnitude of pressing of an indicator may be provided separately. Even when a controller of the related art as disclosed in JP 2014-179035 A is combined with such a touch panel, the position of the indicator and pressing cannot be detected simultaneously.

Thus, the present disclosure provides a touch panel system capable of simultaneously detecting the position of an indicator and the magnitude of pressing, and a display device including the touch panel system.

In order to solve the above-described problems, a touch panel system according to an embodiment of the present disclosure includes a touch panel including a drive electrode, a position detection electrode, and a pressing detection electrode, and a controller configured to impart a drive signal to the drive electrode and acquire signal values from each of the position detection electrode and the pressing detection electrode, and the controller detects a position of an indicator on the basis of the signal values obtained from the position detection electrode and calculates a magnitude of pressing of the indicator on the basis of signal values in a pressing detection range corresponding to the detected position of the indicator among the signal values obtained from the pressing detection electrode.

In the touch panel system having the configuration described above, the controller detects the position of the indicator and calculates a pressing value on the basis of the signal values in the pressing detection range corresponding to the position. Thus, the touch panel system can simultaneously detect the position of the indicator and the magnitude of pressing.

BRIEF DESCRIPTION OF DRAWINGS

The disclosure will be described with reference to the accompanying drawings, wherein like numbers reference like elements.

DESCRIPTION OF EMBODIMENTS

Figure 1:
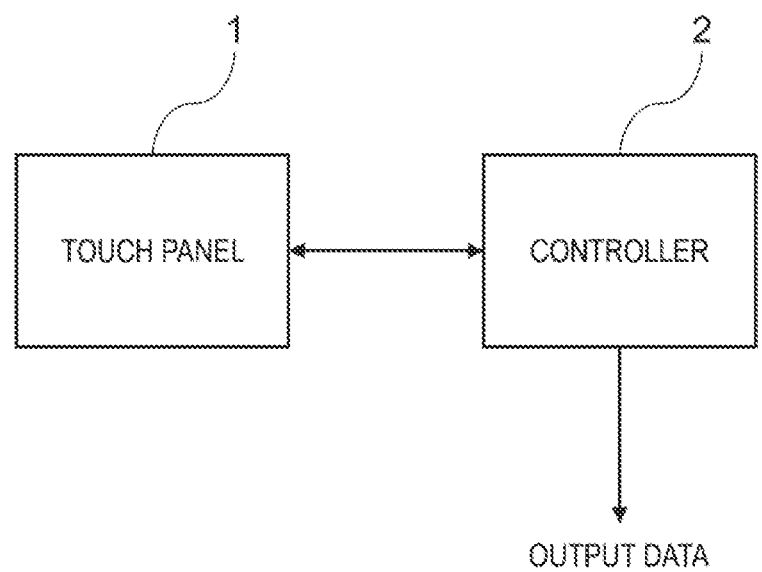
FIG. 1 is a block diagram illustrating a configuration of a touch panel system S according to a first embodiment.

Hereinafter, embodiments of the present disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios. Further, in the drawings referred to below, various electrodes are displayed with hatching in order to facilitate the identification of the various electrodes.

First Embodiment

First, a configuration of a touch panel system S will be described with reference to the drawings. FIG. 1 is a block diagram illustrating a configuration of a touch panel system S according to a first embodiment. As illustrated in FIG. 1, the touch panel system S includes a touch panel 1 and a controller 2.

The touch panel 1 includes a drive electrode, a position detection electrode, and a pressing detection electrode, as will be described below. The controller 2 imparts a drive signal to the drive electrode to obtain a signal from each of the position detection electrode and the pressing detection electrode and generate output data including the position and magnitude of pressing of an indicator. The output data is, for example, used for the control of an image displayed on a display device, and the like in a control unit included in the display device including the touch panel system S.

Figure 2:
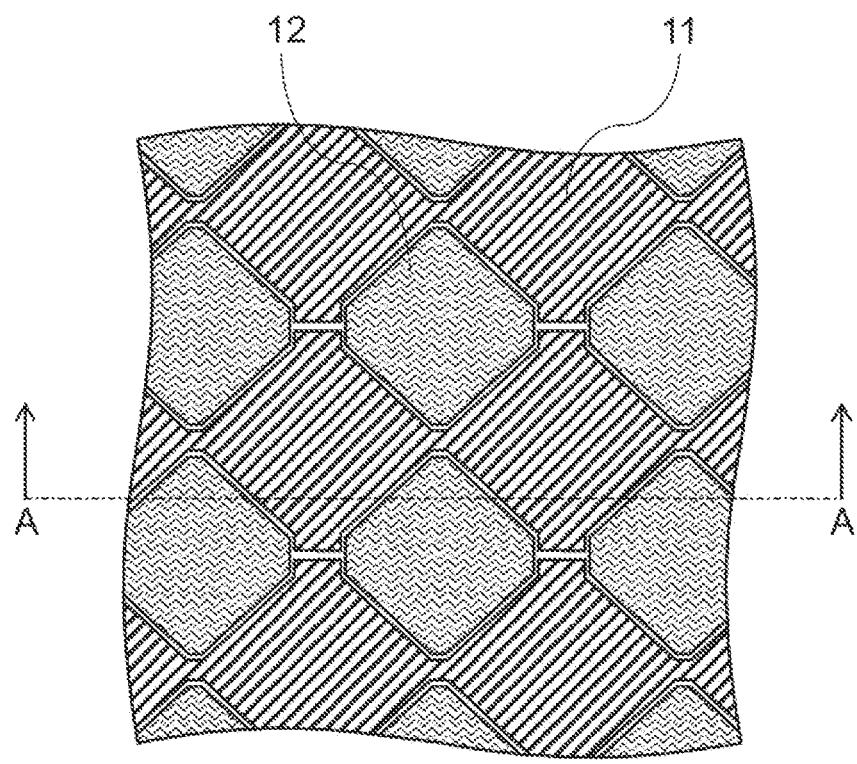
FIG. 2 is a plan view illustrating a configuration of an electrode included in a touch panel 1.
Figure 3:
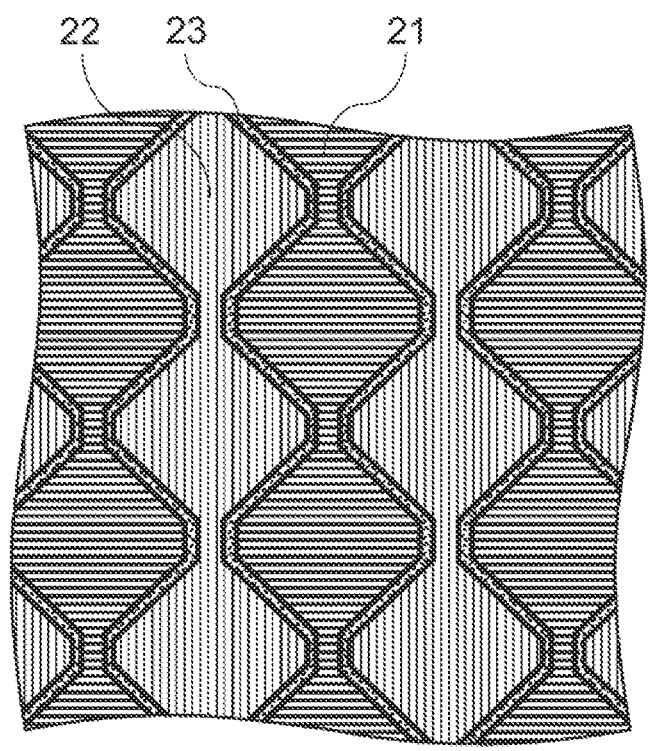
FIG. 3 is a an view illustrating a configuration of an electrode included in the touch panel 1.
Figure 4:
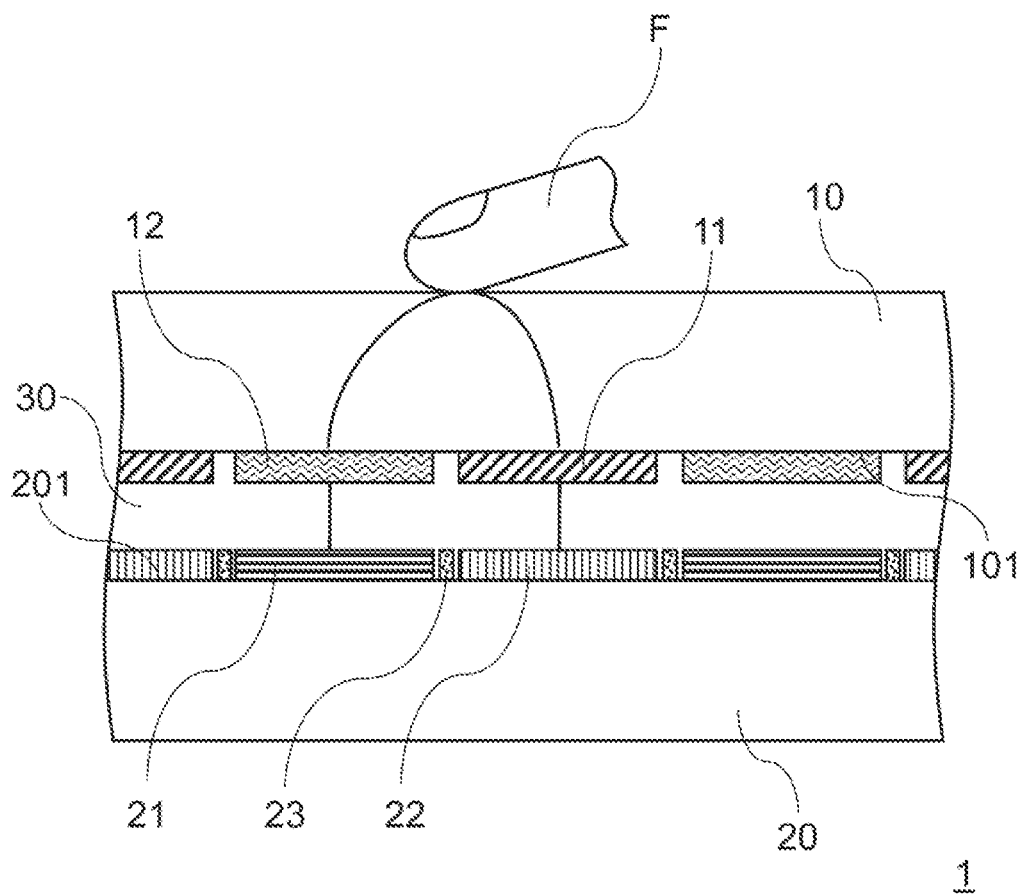
FIG. 4 is a cross-sectional view illustrating a cross section taken along a line A-A in FIGS. 2 and 3.

Next, a configuration of the touch panel 1 will be described with reference to the drawings. FIGS. 2 to 4 are diagrams illustrating a schematic configuration of the touch panel 1 according to the first embodiment. FIGS. 2 and 3 are plan views illustrating a configuration of electrodes included in the touch panel 1 according to the first embodiment. FIG. 4 is a cross-sectional view illustrating a cross section taken along a line A-A in FIGS. 2 and 3. Note that, for ease of illustration, the electrodes included in the touch panel 1 are illustrated separately in FIGS. 2 and 3, but as illustrated in FIG. 4, the electrodes illustrated in FIGS. 2 and 3 are layered.

As illustrated in FIG. 4, the touch panel 1 includes a first substrate 10, a drive electrode 11, a floating island electrode 12, a second substrate 20, a position detection electrode 21, a pressing detection electrode 22, a shield electrode 23, and a dielectric layer 30. For example, the first substrate 10 and the second substrate 20 may be each formed of a transparent material such as a glass polyethylene terephthalate (PET) film. In addition, the drive electrode 11, the floating island electrode 12, the position detection electrode 21, the pressing detection electrode 22, and the shield electrode 23 are formed of a conductive transparent material such as Indium Tin Oxide (ITO). In addition, the dielectric layer 30 is formed of an elastic transparent material such as a polymeric material, an Optical Clear Adhesive (OCA), or an Optical Clear Resin (OCR).

The first substrate 10 and the second substrate 20 are disposed such that a first surface 101 of the first substrate 10 and a second surface 201 of the second substrate 20 face each other. The drive electrode 11 is an electrode to which a drive signal is imparted and is formed on the first surface 101. The floating island electrode 12 is in a floating state and is formed on the first surface 101.

The position detection electrode 21 is an electrode for detecting the position of an indicator and is formed on the second surface 201. The pressing detection electrode 22 is an electrode for detecting the magnitude of pressing of the indicator and is formed on the second surface 201. The shield electrode 23 is provided with a potential equal to a ground potential or a potential provided to the position detection electrode 21 or the pressing detection electrode 22 or is in a floating state, and is formed on the second surface 201.

As illustrated in FIG. 2, the drive electrode 11 has a shape (diamond pattern) in which a plurality of rhombus-shaped electrodes are connected to each other in diagonal directions thereof. In addition, the floating island electrode 12 is constituted by a plurality of rhombus-shaped electrodes D2 that are not connected to each other.

As illustrated in FIG. 3, the position detection electrode 21 has a diamond pattern in which a plurality of rhombus-shaped electrodes are connected to each other, similar to the drive electrode 11. Further, the pressing detection electrode 22 also has a diamond pattern in which a plurality of rhombus-shaped electrodes are connected to each other. A connecting direction in which the rhombus-shaped electrodes of the position detection electrode 21 are connected and a connecting direction in which the rhombus-shaped electrodes of the pressing detection electrode 22 are connected are parallel to each other, and the position detection electrode 21 and the pressing detection electrode 22 are alternately disposed with respect to a direction perpendicular to the connecting directions. The connecting direction of the rhombus-shaped electrodes in each of the position detection electrode 21 and the pressing detection electrode 22 is perpendicular to the connecting direction of the rhombus-shaped electrodes in the drive electrode 11.

In addition, as illustrated in FIGS. 3 and 4, the shield electrode 23 is disposed between the position detection electrode 21 and the pressing detection electrode 22. For example, the shield electrode 23 may be disposed between the position detection electrode 21 and the pressing detection electrode 22 to separate these electrodes from each other.

When the second substrate 20 is viewed from the first substrate 10 in a plan view (hereinafter, simply referred to as a "plan view"), the drive electrode 11 covers at least a portion of the pressing detection electrode 22. Note that in the touch panel 1 illustrated in FIGS. 2 to 4, one rhombus-shaped electrode constituting the drive electrode 11 includes one rhombus-shaped electrode constituting the pressing detection electrode 22 in a plan view. Similarly, one rhombus-shaped electrode constituting the floating island electrode 12 includes one rhombus-shaped electrode constituting the position detection electrode 21 in a plan view.

Next, operations of the touch panel 1 will be described with reference to the drawings. In FIG. 4, electric force lines corresponding to capacitive coupling occurring between an indicator F and various electrodes and capacitive coupling occurring between the various electrodes are indicated by dashed lines. As illustrated in FIG. 4, when the indicator F comes into contact with the surface of the first substrate 10 on a side opposite to the first surface 101, the drive electrode 11 and the floating island electrode 12 are capacitively coupled to each other. At this time, the floating island electrode 12 and the position detection electrode 21 are capacitively coupled to each other, and thus the drive electrode 11 and the position detection electrode 21 are capacitively coupled to each other via the floating island electrode 12. Thereby, electrostatic capacitance between the drive electrode 11 and the position detection electrode 21 decreases via the indicator F, and a signal detected at the position detection electrode 21 changes, whereby the position of the indicator F is detected.

Additionally, as illustrated in FIG. 4, the drive electrode 11 and the pressing detection electrode 22 are capacitively coupled to each other. Here, when the first substrate 10 is pressed by the indicator F, a distance between the drive electrode 11 and the pressing detection electrode 22 decreases because the dielectric layer 30 is a material having elasticity. Thereby, electrostatic capacitance between both the electrodes 11 and 22 increases, and a signal detected at the pressing detection electrode 22 changes, whereby the magnitude of pressing is detected.

When the first substrate 10 is pressed by the indicator F, the distance between the drive electrode 11 and the position detection electrode 21 decreases. However, since the drive electrode 11 is closer to the shield electrode 23 than to the position detection electrode 21, the drive electrode 11 is likely to be capacitively coupled to the shield electrode 23. Thus, electrostatic capacitance between the drive electrode 11 and the position detection electrode 21 is less likely to increase, and the decrease in electrostatic capacitance between the drive electrode 11 and the position detection electrode 21 due to the indicator F is less likely to be canceled out.

In addition, since the indicator F is closer to the shield electrode 23 than to the pressing detection electrode 22 on a path from the indicator F to the pressing detection electrode 22, the indicator F is likely to be capacitively coupled to the shield electrode 23. Thus, the indicator F is inhibited from being capacitively coupled to each of the drive electrode 11 and the pressing detection electrode 22, and this inhibits electrostatic capacitance between both the electrodes from fluctuating.

Figure 5:
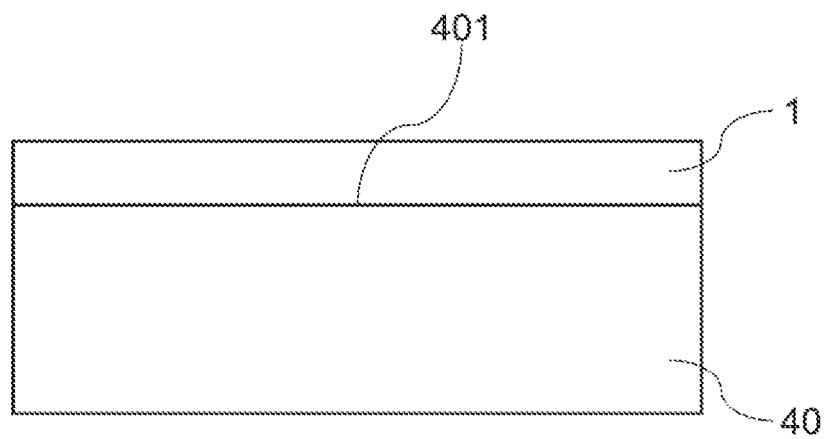
FIG. 5 is a cross-sectional view illustrating a configuration of a display device P including the touch panel system S according to the first embodiment.

The touch panel system S is included in, for example, a display device. FIG. 5 is a cross-sectional view illustrating a configuration of a display device P including the touch panel system S according to the first embodiment. As illustrated in FIG. 5, the display device P includes the touch panel 1 and a display unit 40 that displays an image on a display surface 401. The display unit 40 may be configured by, for example, a liquid crystal display, an organic Electro Luminescence (EL) display, or the like. The touch panel 1 is disposed on the display surface 401 of the display unit 40 such that the second substrate 20 is adjacent to the display unit 40 side.

Figure 6:
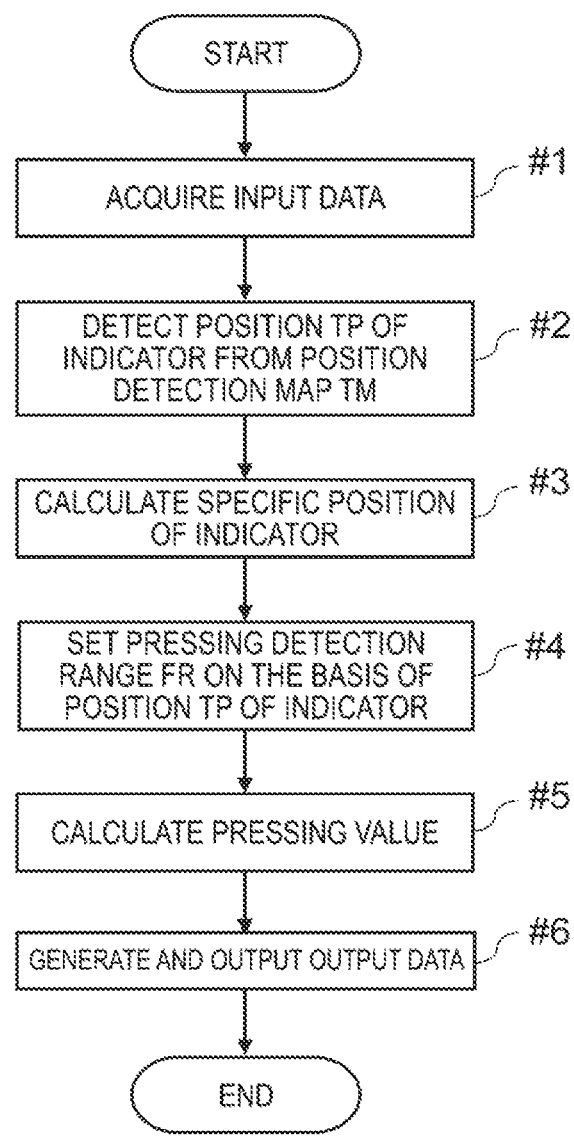
FIG. 6 is a flowchart illustrating a method of detecting the position and magnitude of pressing of an indicator by a controller 2 included in the touch panel system S according to the first embodiment.
Figure 7:
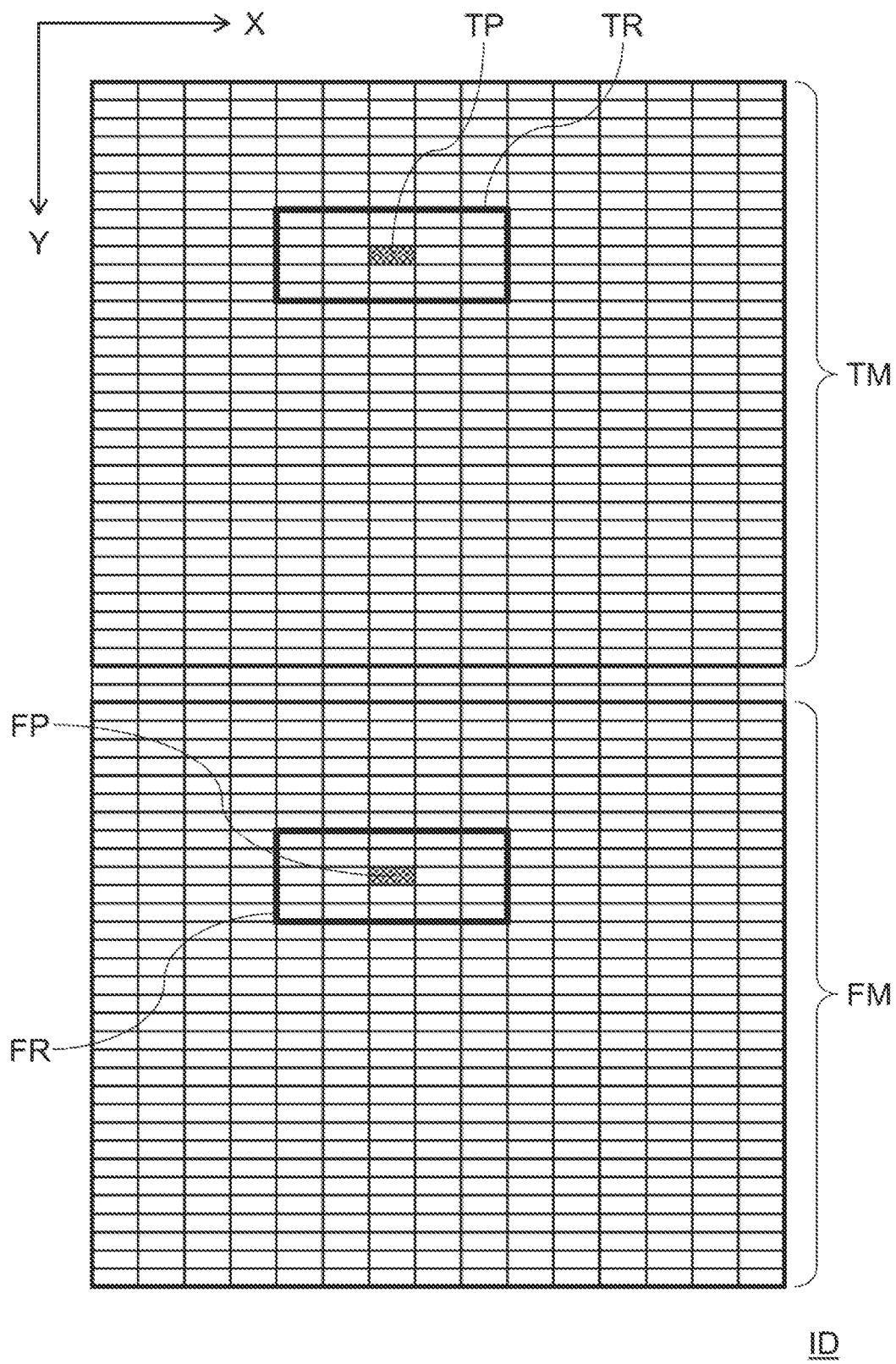
FIG. 7 is a schematic diagram illustrating a configuration example of an input data ID to be processed by the controller 2.

Next, a method of detecting the position and magnitude of pressing of the indicator F by the controller 2 will be described with reference to the drawings. FIG. 6 is a flowchart illustrating a method of detecting the position and magnitude of pressing of the indicator F by the controller 2 included in the touch panel system S according to the first embodiment. FIG. 7 is a schematic diagram illustrating a configuration example of an input data ID to be processed by the controller 2.

As illustrated in FIG. 6, the controller 2 first acquires the input data ID (step #1). At this time, the controller 2 imparts a drive signal to the drive electrode 11 and acquires signals from the position detection electrode 21 and the pressing detection electrode 22 to acquire the input data ID.

Here, the input data ID will be described with reference to the drawings. The input data ID illustrated in FIG. 7 is data obtained in a case where the number of drive electrodes 11 is 15 and the number of position detection electrodes 21 and the number of pressing detection electrodes 22 are both 32. The input data ID is data having elements represented by two-dimensional coordinates of (X, Y). An X direction is a direction in which the drive electrodes 11 are aligned, and a Y direction is a direction in which the position detection electrodes 21 and the pressing detection electrodes 22 are aligned. Note that, in the following, a direction in which the value of Y increases will be represented as a downward direction, and a direction in which the value of Y decreases will be represented as an upward direction.

The input data ID is data that is a combination of signal values obtained from the position detection electrodes 21 and the pressing detection electrodes 22 in different regions of a single two-dimensional coordinate system. In the input data ID illustrated in FIG. 7, a position detection map TM in which signal values obtained from the position detection electrodes 21 are arranged and a pressing detection map FM in which signal values obtained from the pressing detection electrodes 22 are arranged are placed in different regions so that the position detection map TM is on the upper side and the pressing detection map FM is on the lower side with two rows of dummies in the center portion in the Y direction. As illustrated in FIGS. 3 and 4, the position detection electrodes 21 and the pressing detection electrodes 22 are alternately arranged, but in the input data ID, the signal values obtained from the respective electrodes are separated. In the input data ID illustrated in FIG. 7, a signal value corresponding to electrostatic capacitance formed by an X-th drive electrode 11 and a Y-th position detection electrode 21 with a certain corner on the touch panel 1 as an origin is an element of (X, Y). On the other hand, the signal value corresponding to the electrostatic capacitance formed by the X-th drive electrode 11 and a Y-th pressing detection electrode 22 is an element of (X, Y+34).

The following is an example of the input data ID in a case where a signal value of an element equivalent to the vicinity of the center of a contact portion of the indicator F in the position detection map TM increases to a positive value, and a signal value of an element equivalent to the vicinity of the center of a contact portion of the indicator F in the pressing detection map FM increases to a positive value in a case where the surface of the touch panel 1 is pressed by the indicator F.

Next, the controller 2 detects a position TP of the indicator F from the position detection map TM of the input data ID (step #2). For example, the controller 2 detects an element of which the signal value is equal to or greater than a predetermined threshold and is a maximum in the position detection map TM among the elements in the position detection map TM, as the position TP of the indicator F. Note that in a case where there is no element of which the signal value is equal to or greater than the threshold value in the position detection map TM, the controller 2 may determine that the indicator F that is in contact with the touch panel 1 is not present, and output output data indicating the absence of the indicator F.

Figure 8:
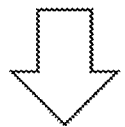
FIG. 8 is a schematic diagram illustrating a method of calculating a specific position of an indicator by the controller 2.

Next, the controller 2 calculates a specific position of the indicator F (step #3). A method of calculating the specific position by the controller 2 will be described with reference to FIG. 8. FIG. 8 is a schematic diagram illustrating a method of calculating a specific position of an indicator by the controller 2. Note that, in FIG. 8, the position TP of the indicator F is indicated as (0, 0).

As illustrated in FIGS. 7 and 8, the controller 2 sets a position detection range TR having a size of A×B to include the position TP of the indicator F detected in step #2. FIGS. 7 and 8 illustrate a case where a 5×5 region is set as the position detection range TR with the position TP of the indicator F as a center. Note that, in a case where the position detection range TR having a size of 5×5 is set with the position TP of the indicator F as a center and a portion of the position detection range TR protrudes from the position detection map TM, the position detection range TR may be set to be smaller than a size of 5×5 by deleting the protruding portion, or may be set to have a size of 5×5 but fit within the position detection map TM by shifting the position TP of the indicator F from the center.

The controller 2 calculates a signal value C (X, Y) by cumulatively adding signal values D(X, Y) in the position detection range TR in the Y direction. Specifically, the controller 2 calculates the signal value C(X, Y) from C(X, Y)=C(X, Y−1)+D(X, Y). However, when the signal value C(X, Y) is calculated, the controller 2 sets C(X, Y)=D(X, Y) for elements at an upper end in the position detection range TR for which C(X, Y−1) cannot be calculated.

For the calculated signal value C(X, Y), the controller 2 calculates the position of the center of gravity on the basis of the magnitude of the signal value and coordinates (X, Y), and sets the position of the center of gravity as a specific position of the indicator F. When the specific position of the indicator F is calculated in this way, the position of the indicator F which is present between the coordinates (X, Y) can be detected, and thus a resolution for detecting the position of the indicator F can be improved.

Next, the controller 2 sets a pressing detection range FR in the pressing detection map FM of the input data ID (step #4). As illustrated in FIG. 7, the controller 2 sets the pressing detection range FR having a size C×D to include the position TP of the indicator F detected in step #2. FIG. 7 illustrates a case where a region of 5×5 is set as the pressing detection range FR centering on the position FP in the pressing detection map FM corresponding to the position TP of the indicator F. In the case of the example illustrated in FIG. 7, an X coordinate of the position FP is the same as that of the position TP, and a Y coordinate of the position FP is a value obtained by adding 34 to the Y coordinate of the position TP. Note that, in a case where the pressing detection range FR having a size of 5×5 is set with the position FP as a center and a portion of the pressing detection range FR protrudes from the pressing detection map FM, the pressing detection range FR may be set to be smaller than a size of 5×5 by deleting the protruding portion, or may be set to have a size of 5×5 but fit within the pressing detection map FM without being centered on the position FP.

Next, the controller 2 calculates a pressing value which is the magnitude of pressing of the indicator F, on the basis of signal values in the pressing detection range FR (step #5). For example, the controller 2 calculates the pressing value by adding up absolute values of the signal values in the pressing detection range FR. Note that, in a method of calculating a pressing value including a method of setting the pressing detection range FR, it is preferable to set a pressing value to be a value proportional to a pressing force, for example, when the indicator F, which has a certain contact area, is pressed against the touch panel 1 while changing the pressing force.

Finally, the controller 2 generates and outputs output data including the specific position and pressing value of the indicator F (step #6).

As described above, in the touch panel system S, the controller 2 detects the position TP of the indicator F, and calculates a pressing value on the basis of the signal value of the pressing detection range FR corresponding to the position TP (the position FP). Thus, the touch panel system S can simultaneously detect the position and magnitude of pressing of the indicator F.

Further, in the touch panel system 5, the input data ID is composed of a combination of signal values obtained from each of the position detection electrode 21 and the pressing detection electrode 22 in different regions of a single two-dimensional coordinate system. Thus, it is possible to obtain the controller 2 that is applicable to the touch panel system S by simply changing the design of the controller that detects only the position of the indicator F of the related art.

Second Embodiment

Next, a second embodiment will be described. The second embodiment differs from the first embodiment in terms of the method of calculating a pressing value by the controller 2. Thus, a method of calculating a pressing value in the second embodiment will be described below.

Figure 9:
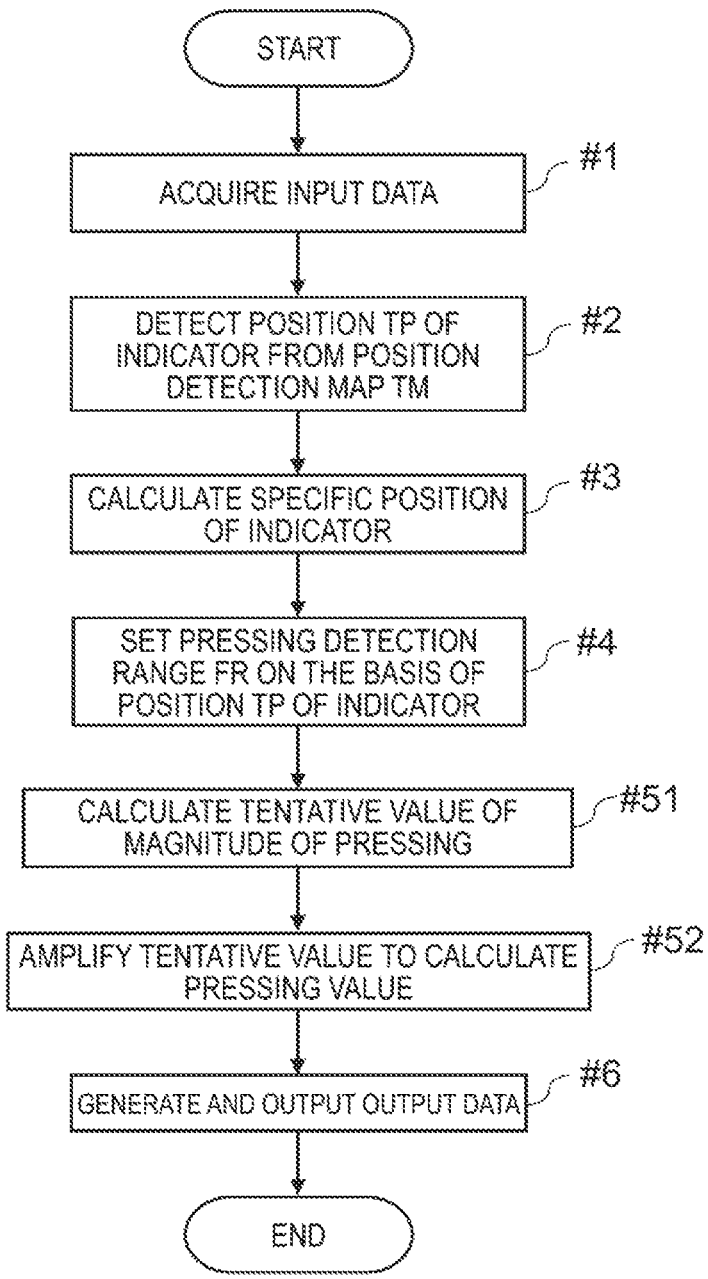
FIG. 9 is a flowchart illustrating a method of detecting the position and magnitude of pressing of an indicator by a controller 2 included in a touch and system S according to a second embodiment.

FIG. 9 is a flowchart illustrating a method of detecting the position and magnitude of pressing of an indicator by a controller 2 included in a touch panel system S according to the second embodiment. As illustrated in FIG. 9, the controller 2 calculates a tentative value of the magnitude of pressing applied by an indicator F (step #51). At this time, the controller 2 calculates the tentative value by a calculation method similar to that for a pressing value in the first embodiment.

Next, the controller 2 amplifies the tentative value to calculate a pressing value (step #52). The method of amplifying the tentative value is arbitrary. For example, the controller 2 may multiply the tentative value by an amplification factor and then add or subtract an offset value to or from the value to calculate a pressing value.

As described above, in the touch panel system S, the controller 2 amplifies a tentative value to calculate a pressing value. Thus, the touch panel system S can accurately calculate the pressing value corresponding to the magnitude of pressing of the indicator F.

Third Embodiment

Next, a third embodiment will be described. Also, in the third embodiment, a pressing value is calculated by amplifying a tentative value in the same manner as in the second embodiment, but the amplification method thereof is unique. Thus, the method of amplifying a tentative value according to the third embodiment will be described below.

Figure 10:
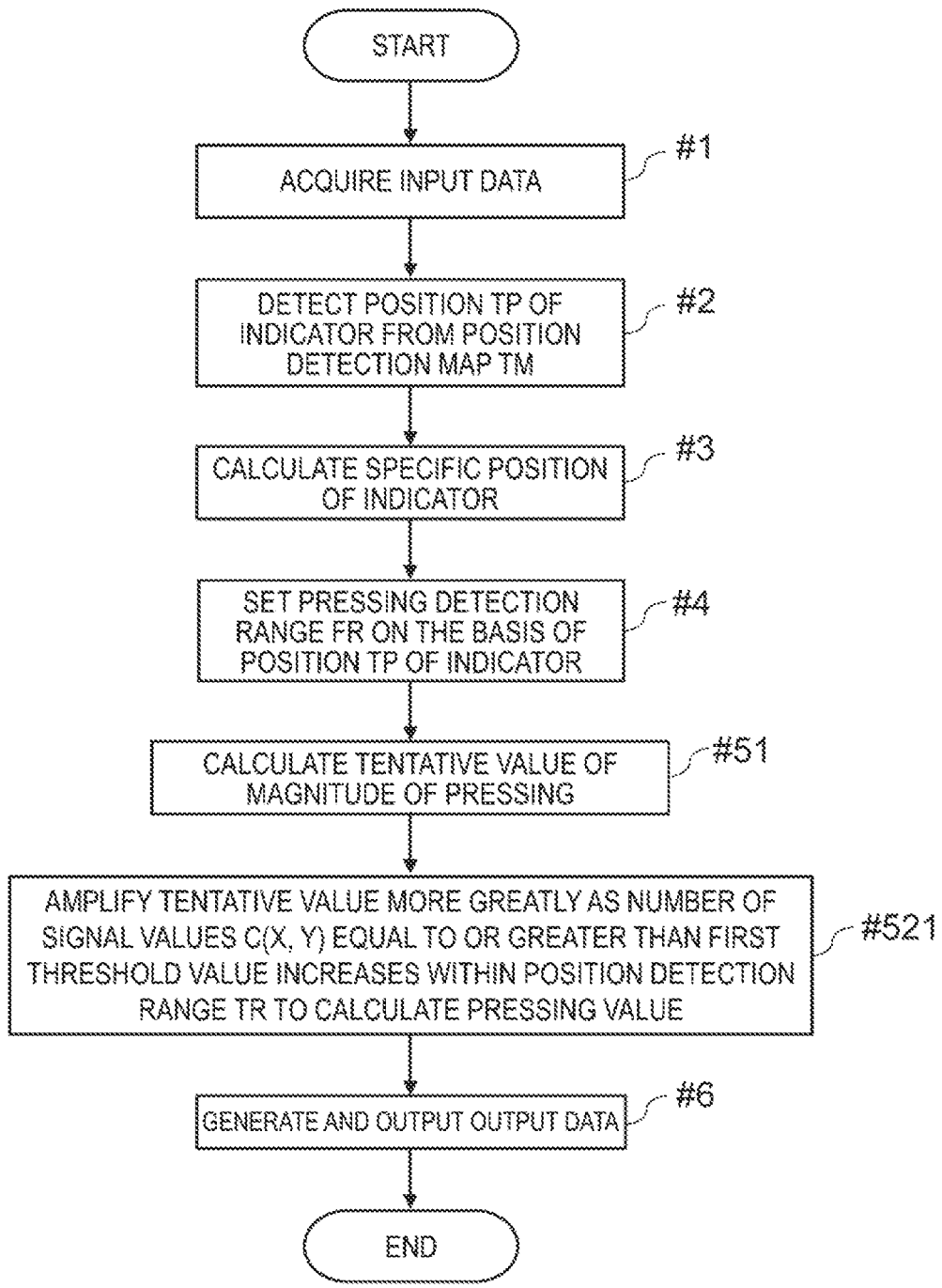
FIG. 10 is a flowchart illustrating a method of detecting the position and magnitude of pressing of an indicator by a controller 2 included in a touch panel system S according to a third embodiment.

FIG. 10 is a flowchart illustrating a method of detecting the position of an indicator and the magnitude of pressing by a controller 2 included in a touch panel system S according to the third embodiment. As illustrated in FIG. 10, the controller 2 calculates a pressing value that is amplified more greatly as the number of signal values C(X, Y) equal to or greater than a first threshold value increases among signal values C(X, Y) in a position detection range TR for calculating a specific position of an indicator F illustrated in FIG. 8 (step #521). For example, the controller 2 increases an amplification factor to be multiplied by a tentative value as the number of signal values C(X,Y) equal to or greater than the first threshold value increases. Note that the amplification factor may increase continuously in response to an increase in the number of signal values C(X,Y) equal to or greater than the first threshold value, or may increase in a stepwise manner. In addition, the controller 2 may multiply a tentative value by an amplification factor and then add or subtract an offset value corresponding to the amplification factor to or from the value to calculate a pressing value.

As a contact range of the indicator F increases, a pressing force of the indicator becomes dispersed over a larger range, which may result in a case where a pressing value to be calculated becomes smaller. In the touch panel system S according to the third embodiment, the controller 2 amplifies a tentative value to calculate a pressing value as described above, thereby preventing the pressing value from decreasing in a case where a contact range of the indicator F increases.

As described above, in the touch panel system S, the controller 2 amplifies a tentative value more greatly as the number of signal values C(X, Y) equal to or greater than the first threshold value increases. Thus, even when a contact range of the indicator F increases, the touch panel system S can calculate a pressing value with high accuracy.

Fourth Embodiment

Next, a fourth embodiment will be described. Also, in the fourth embodiment a pressing value is calculated by amplifying a tentative value in the same manner as in the second and third embodiments, but the fourth embodiment differs from the third embodiment in terms of the amplification method. Thus, a method of amplifying a tentative value according to the fourth embodiment will be described below.

Figure 11:
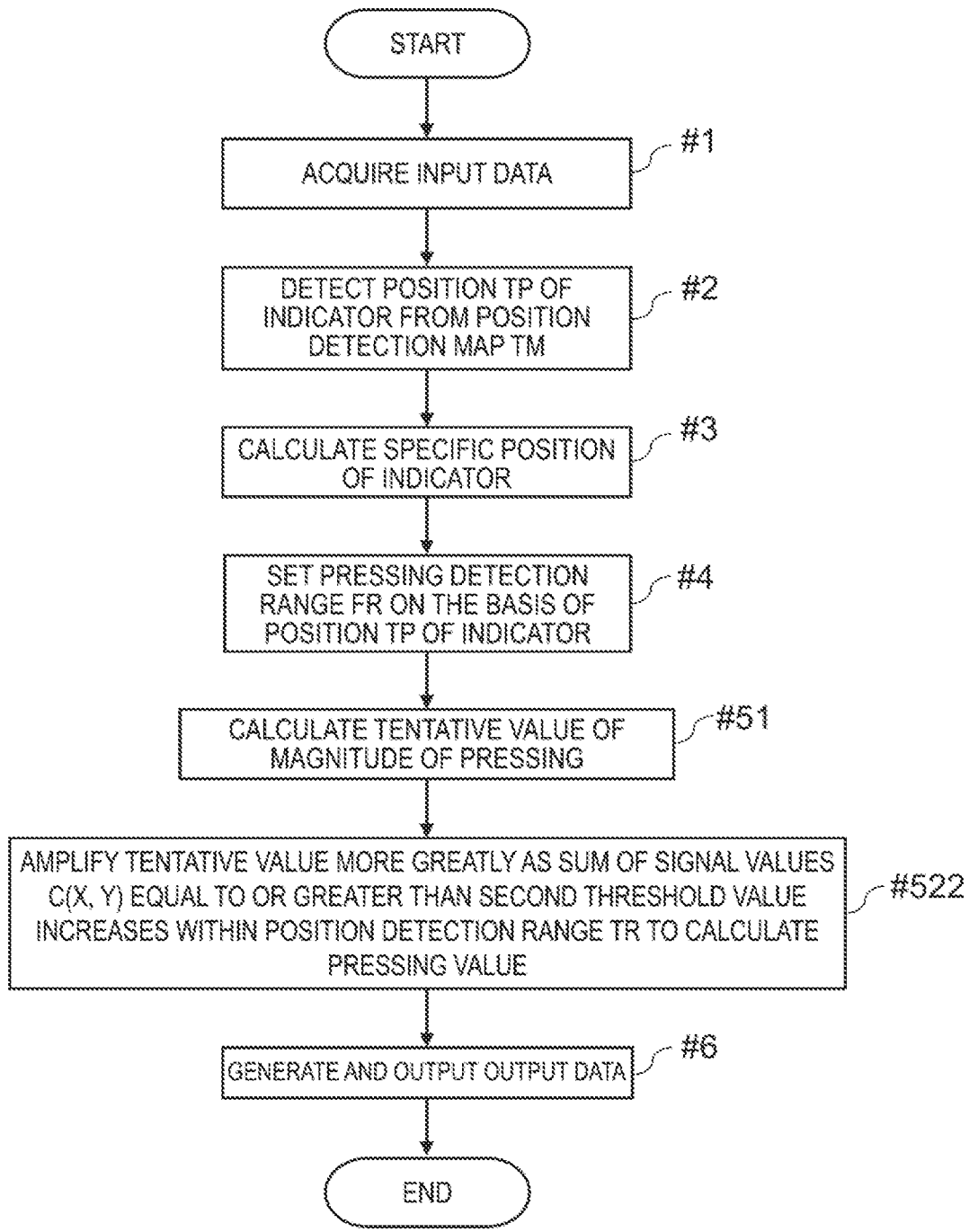
FIG. 11 is a flowchart illustrating a method of detecting the position and magnitude of pressing of an indicator by a controller 2 included in a touch panel system S according to a fourth embodiment.

FIG. 11 is a flowchart illustrating a method of detecting the position of an indicator and the magnitude of pressing by a controller 2 included in a touch panel system S according to the fourth embodiment. As illustrated in FIG. 11, the controller 2 calculates a pressing value that is amplified more greatly as the sum of signal values C(X, Y) equal to or greater than a second threshold value increases among signal values C(X, Y) in a position detection range TR for calculating a specific position of an indicator F illustrated in FIG. 8 (step #522). For example, the controller 2 increases an amplification factor to be multiplied by a tentative value as the sum of signal values C(X, Y) equal to or greater than the second threshold value increases. Note that the amplification factor may increase continuously in response to an increase in the sum of signal values C(X, Y) equal to or greater than the second threshold value, or may increase in a stepwise manner. In addition, the controller 2 may multiply a tentative value by an amplification factor and then add or subtract an offset value corresponding to the amplification factor to or from the value to calculate a pressing value. In addition, the second threshold value may be 0.

Similar to the third embodiment, also in the touch panel system S according to the fourth embodiment, the controller 2 calculates a pressing value by amplifying a tentative value as described above, thereby preventing the pressing value from decreasing in a case where a contact range of the indicator F increases.

As described above, in the touch panel system S, the controller 2 amplifies a tentative value more greatly as the number of signal values C(X, Y) equal to or greater than the first threshold value increases. Thus, even when a contact range of the indicator F increases, the touch panel system S can calculate a pressing value with high accuracy.

Further, in the fourth embodiment, the magnitude of amplification is determined in accordance with the sum of signal values C(X, Y), and thus it is possible to prevent the magnitude of amplification from varying due to a slight difference in one signal value C(X, Y), unlike in a case where the magnitude of amplification is determined in accordance with the number of signal values C(X, Y). Thus, a pressing value can be calculated with higher accuracy.

Fifth Embodiment

Next, a fifth embodiment will be described. Also, in the fifth embodiment a pressing value is calculated on the basis of a tentative value in the same manner as in the second to fourth embodiments, but the fifth embodiment differs from the second to fourth embodiments in terms of the calculation method. Thus, a method of calculating a tentative value in the fifth embodiment will be described below.

Figure 12:
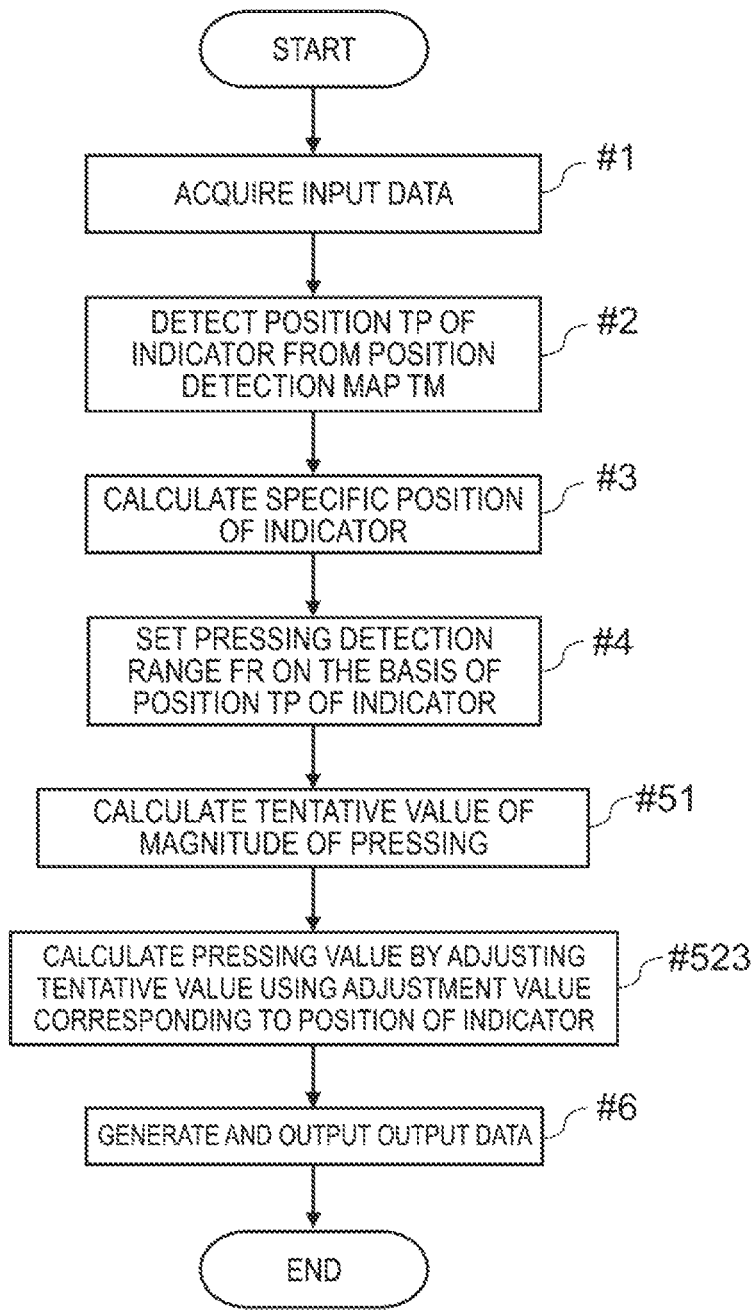
FIG. 12 is a flowchart illustrating a method of detecting the position and magnitude of pressing of an indicator by a controller 2 included in a touch panel system S according to a fifth embodiment.

FIG. 12 is a flowchart illustrating a method of detecting the position of an indicator and the magnitude of pressing by a controller 2 included in a touch panel system S according to the fifth embodiment. As illustrated in FIG. 12, the controller 2 calculates a tentative value in the same manner as in the second to fourth embodiments (step #51) and then adjusts the tentative value using an adjustment value corresponding to the position of an indicator to calculate a pressing value (step #523).

Figure 13:
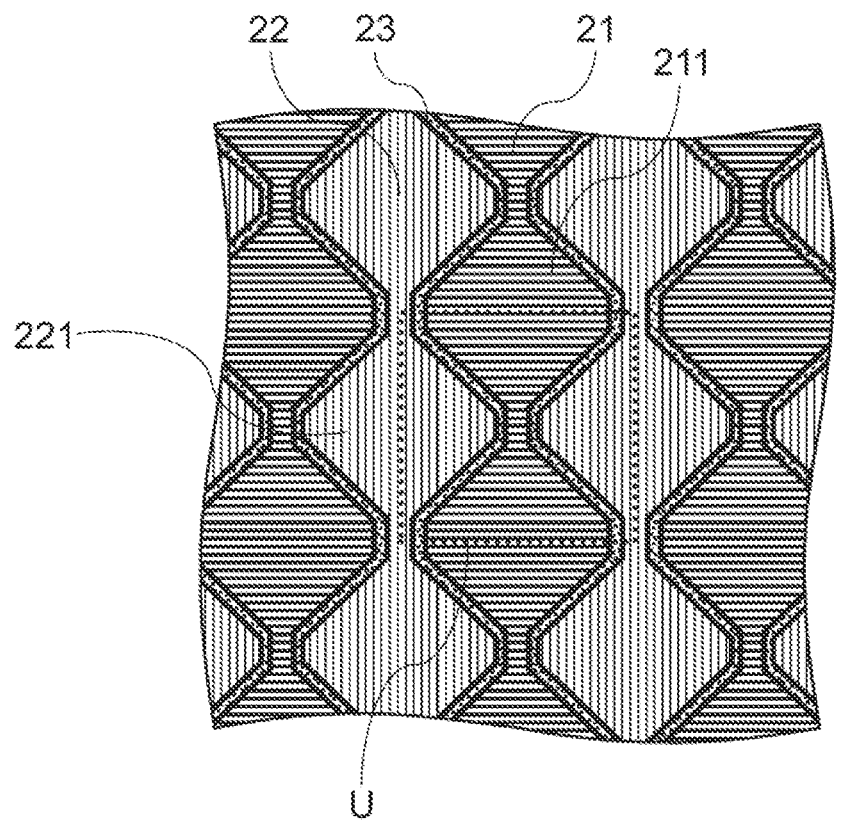
FIG. 13 is a plan view illustrating a configuration of an electrode included in a touch panel 1.

Here, the adjustment value will be described. FIG. 13 is a plan view illustrating a configuration of an electrode included in a touch panel 1, and is a diagram illustrating a configuration of the same electrode as in FIG. 3. As illustrated in FIG. 13, a position detection electrode 21 and a pressing detection electrode 22 are respectively constituted by a plurality of rhombus-shaped wide portions 211 and 221 in which diagonal lines are arranged on a straight line, and the plurality of position detection electrodes 21 and pressing detection electrodes 22 are alternately arranged such that the plurality of wide portions 211 and 221 are staggered. Additionally, the position detection electrode 21 and the pressing detection electrode 22 have a shape in which a repetitive pattern U is continuous in the plane. Note that the repetitive pattern U illustrated in FIG. 13 includes two wide portions 211 and two wide portions 221 which are two half portions separated and centered on a connecting portion of the wide portion 211, but a different portion (for example, a portion including two wide portions 211 and two wide portions 221 which are two half portions separated and centered on a connecting portion of the wide portion 221, a portion including four wide portions 221 which are four quarter portions separated and centered on the wide portion 211, a portion including four wide portions 211 which are four quarter portions separated and centered on the wide portion 221, or the like) may also be a repetitive pattern. Additionally, as, illustrated in FIG. 4, a drive electrode 11 and a pressing detection electrode 22 face each other.

In the case of the above-described electrode configuration, it is more likely that a distance between the electrodes 11 and 22 decreases when pressing directly above a central portion of the wide portion 221 in the pressing detection electrode 22 than when pressing directly above a central portion of the wide portion 211 in the position detection electrode 21, and thus the capacitance is likely to increase, and a signal value is also likely to increase. Further, such a difference in signal values (difference in pressing sensitivity) is more likely to occur as the contact area of the indicator decreases.

Thus, in the fifth embodiment, an adjustment value is set such that a difference in signal values (difference in pressing sensitivity) that may occur in the plane of the touch panel 1 is suppressed, and a tentative value is adjusted by the adjustment value. For example, the controller 2 calculates a pressing value by calculating a pressing value=a tentative value×an adjustment value.

Figure 14:
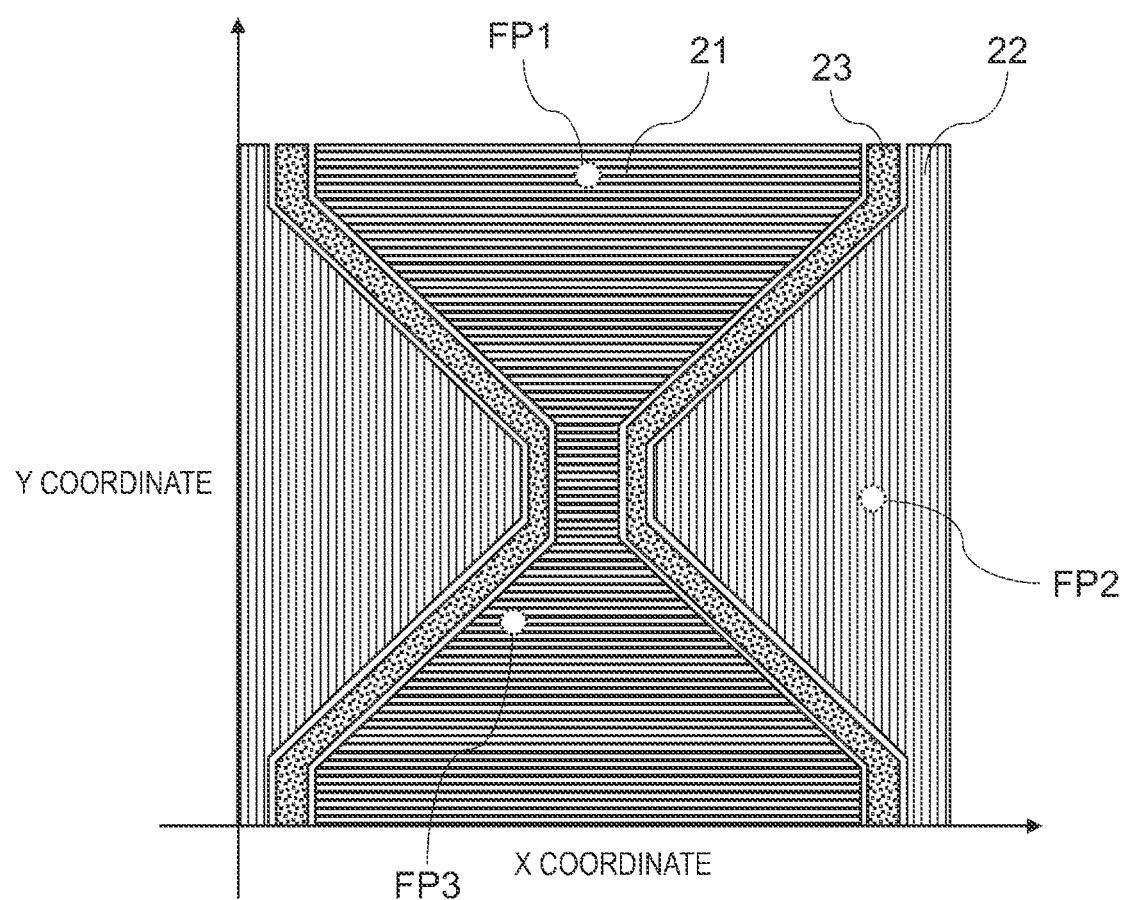
FIG. 14 is a diagram illustrating an example of a method of setting an adjustment value.

FIG. 14 is a diagram illustrating an example of a method of setting an adjustment value. The adjustment value can be set by acquiring tentative values by pressing an indicator having a certain contact area against a plurality of locations of the touch panel 1 with a certain force, and calculating a value such that a difference in the obtained tentative values is reduced. For example, in FIG. 14, it is assumed that a tentative value of a position FP1 is 75, a tentative value of a position FP2 is 100, and a tentative value of a position FP3 is 50. In this case, when an adjustment value of the position FP1 is set to 1, an adjustment value of the position FP2 is set to 0.75, and an adjustment value of the position FP3 is set to 1.5, a pressing value of any the positions FP1 to FP3 is set to 75, and variations in tentative values are suppressed to thereby lead to equal magnitudes. Note that a target pressing value at the time of setting an adjustment value may be set as, for example, an average value of a tentative value, may be set as a maximum value or a minimum value of a tentative value, or may be set as any value set in advance.

An adjustment value may be specified as a function of an x coordinate and a y coordinate in the repetitive pattern U, or may be specified by a look-up table or the like. In a case where an adjustment value is specified as a function of an x coordinate and a y coordinate, for example, the adjustment value may be $a_0+a_1 \cdot x+a_2 \cdot y+a_3 \cdot x^2+a_4 \cdot xy+a_5 \cdot y^2+a_6 \cdot x^3+a_7 \cdot x^2+a_8 \cdot xy^2+a_9 \cdot y^3$ ("$a_0$" to "$a_9$" are constants, "x" is an x coordinate, "y" is a y coordinate, and "·" is a multiplication symbol). Note that the adjustment value may be calculated by acquiring a tentative value only for some of the repetitive patterns U in the touch panel 1, and the same adjustment value as the calculated value may be applied to the other repetitive patterns U, or tentative values may be acquired and calculated for all of the repetitive patterns U of the touch panel 1.

As described above, in the touch panel system S, the controller 2 adjusts a tentative value using an adjustment value corresponding to the position of an indicator to calculate a pressing value. Thus, even when there is a difference in pressing sensitivity in the plane of the touch panel 1, the touch panel system S can reduce the difference.

Note that, although a case where the controller 2 calculates a pressing value by calculating a pressing value=a tentative value×an adjustment value has been exemplified, a pressing value may be calculated by calculating a pressing value=a tentative value+an adjustment value. In this case, for example, in FIG. 14, assuming that the tentative value of the position FP1 is 75, a tentative value of the position FP2 is 100, and a tentative value of the position FP3 is 50, a pressing value of any of the positions FP1 to FP3 is set to 100 by setting an adjustment value of the position FP1 to 25, setting an adjustment value of the position FP2 to 0, and setting an adjustment value of the position FP3 to 50, and variations in tentative values are suppressed to thereby lead to equal magnitudes. Also in a case where a pressing value is calculated by this calculation, a target pressing value at the time of setting an adjustment value may be set as, for example, an average value of a tentative value, may be set as a maximum value or a minimum value of a tentative value, may be set as any value which is set in advance, or some or all of adjustment values may be set to be negative values. In addition, a pressing value may be calculated as a pressing value=a tentative value×a first adjustment value+a second adjustment value.

Sixth Embodiment

In the second and fourth embodiments described above, in a case where an indicator having a wide contact range, for example, a glove is used, a pressing value having an appropriate magnitude is calculated by amplifying a tentative value reduced due to dispersion of the pressing force in a wide range. On the other hand, in the fifth embodiment, in a case where an indicator having a small contact range such as a pen is used, the pressing value is calculated by reducing a variation in pressing sensitivity in the plane of the touch panel 1. In a sixth embodiment, a controller 2 may switch a calculation method for these pressing values in accordance with a contact range of an indicator.

Figure 15:
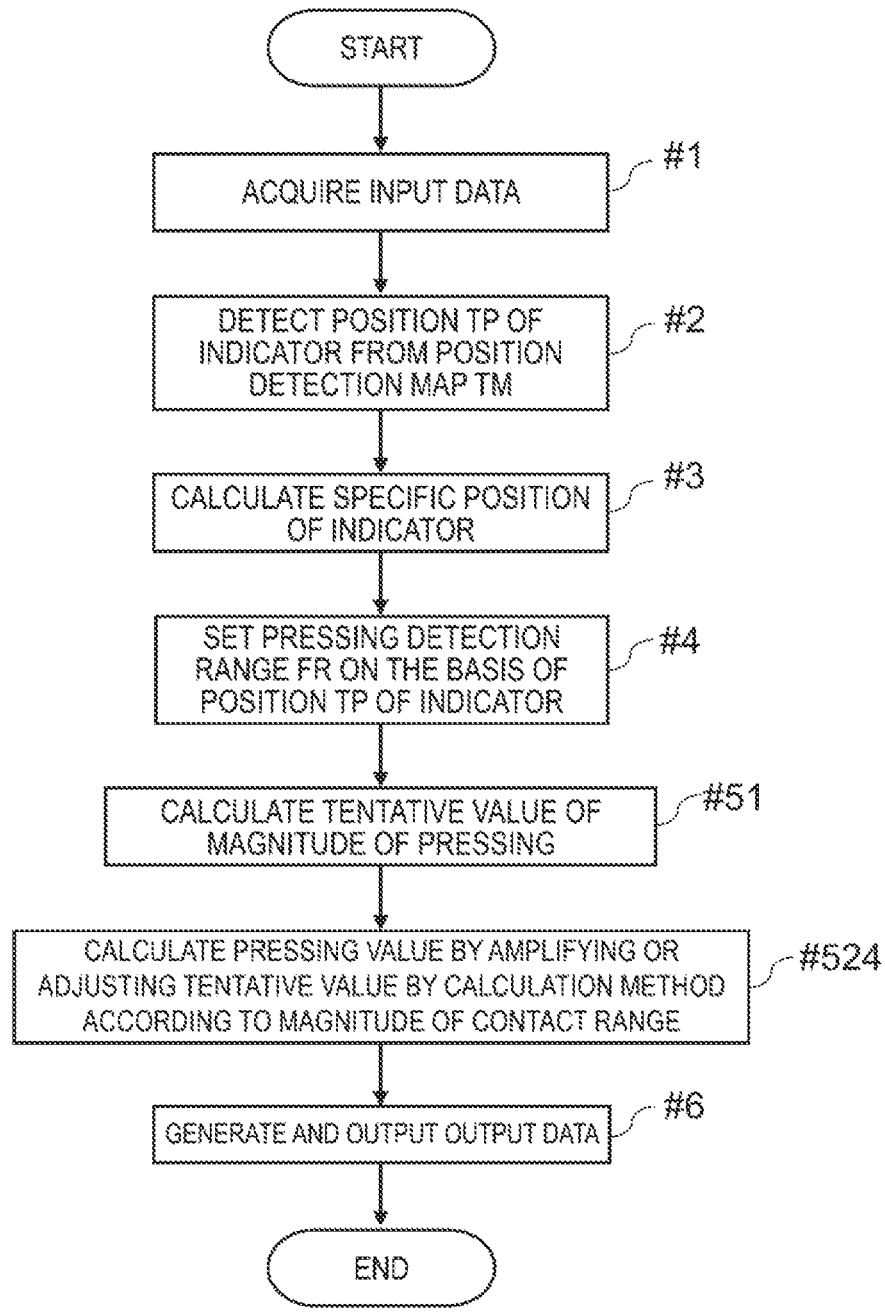
FIG. 15 is a flowchart illustrating a method of detecting the position and magnitude of pressing of an indicator by a controller 2 included in a touch panel system S according to a sixth embodiment.

FIG. 15 is a flowchart illustrating a method of detecting the position and magnitude of pressing of an indicator by the controller 2 included in a touch panel system S according to the sixth embodiment. As illustrated in FIG. 15, the controller 2 calculates a tentative value in the same manner as in the second to fifth embodiments (step #51) and then amplifies or adjusts the tentative value by a calculation method according to a contact range of an indicator to calculate a pressing value (step #524). For example, when a contact of the indicator is equal to or greater than a first switching value, the controller 2 calculates a pressing value by a calculation method for amplifying a tentative value in the same manner as in the second to fourth embodiments. On the other hand, when a contact range of the indicator is equal to or less than a second switching value smaller than the first switching value, the controller 2 calculates a pressing value by a method of adjusting a tentative value in the same manner as in the fifth embodiment. Note that the contact range of the indicator may be calculated as the number of signal values C(X, Y) that are equal to or greater than a first threshold value in the same manner as in the third embodiment, or may be calculated as a total value of signal values C(X, Y) that are equal to or greater than a second threshold value in the same manner as in the fourth embodiment.

As described above, in the touch panel system S, even when a contact range varies due to a change in the type of indicator, or the like, a pressing value can be calculated by a appropriate method according to each of the indicators before and after the variation.

Note that, in a case where the contact range of the indicator is smaller than the first switching value and larger than the second switching value, the controller 2 may calculate a tentative value as a pressing value as is, in the same manner as in the first embodiment, or the controller 2 may calculate a pressing value in a manner different from the first to fifth embodiments.

Further, the first switching value and the second switching value may be matched. That is, when a contact area of an indicator is equal to or greater than the first switching value, the controller 2 may calculate a pressing value by a method of amplifying a tentative value in the same manner as in the second to fourth embodiments, and when the contact area is smaller than the first switching value, the controller 2 may calculate a pressing value by a method of adjusting a tentative value in the same manner as in the fifth embodiment.

Further, in a case where it is difficult to assume that an indicator is changed frequently, a calculation method for a pressing value may not be changed during a certain period of time or a period until the number of touches elapses.

Modifications and the Like

The above-described embodiments are merely examples for carrying out the present disclosure. Accordingly, the present disclosure is not limited to the embodiments described above and can be implemented by modifying the embodiments described above as appropriate without departing from the scope of the present disclosure.

For example, in the touch panel systems S in the first to sixth embodiments described above, a case where the controller 2 detects the position TP of the indicator F in step #2 and then calculates a specific position of the indicator in step #3 has been exemplified. However, the controller 2 may set coordinates of the position TP of the indicator F detected in step #2 as a specific position of the indicator F as is without performing step #3.

Further, in the touch panel systems S in the first to sixth embodiments described above, a case where the controller 2 sets the pressing detection range FR on the basis of the position TP of the indicator F detected in step #2 has been exemplified. However, the controller 2 may set the pressing detection range FR on the basis of the specific position of the indicator F calculated in step #3.

Further, in the touch panel systems S in the third, fourth, and sixth embodiments described above, a case where the controller 2 amplifies a tentative value using an amplification method based on the signal values C(X, Y) has been exemplified; however, a tentative value may be amplified by an amplification method based on signal values D(X, Y) before conversion to the signal values C(X, Y) illustrated in FIG. 8. Further, in the touch panel systems S, the controller 2 may determine the width of a contact range of the indicator F on the basis of indexes other than the number of signal values and the sum of the signal values.

Further, in the touch panel systems S in the first to sixth embodiments described above, the floating island electrode 12 and the shield electrode 23 need not be provided. In addition, each of the drive electrode 11, the floating island electrode 12, the position detection electrode 21, and the pressing detection electrode 22 may be formed in a pattern other than a diamond pattern. Additionally, some or all of the position detection electrode 21, the pressing detection electrode 22, and the shield electrode 23 may be formed of a mesh metal (thin metal wires having a mesh shape).

In addition, the touch panel system and the display device described above can be described as follows.

A touch panel system includes a touch panel including a drive electrode, a position detection electrode, and a pressing detection electrode, and a controller configured to impart a drive signal to the drive electrode and acquire signal values from each of the position detection electrode and the pressing detection electrode, and the controller detects a position of an indicator on the basis of the signal values obtained from the position detection electrode and calculates a magnitude of pressing of the indicator on the basis of signal values in pressing detection range corresponding the detected position of the indicator among the signal values obtained from the pressing detection electrode (first configuration). According to this configuration, the controller detects the position of the indicator and calculates a pressing value on the basis of the signal values in the pressing detection range corresponding to the position. Accordingly, the touch panel system can simultaneously detect the position of the indicator and the magnitude of pressing.

In the first configuration, the controller may calculate the position of the indicator and the magnitude of pressing of the indicator on the basis of input data that is a combination of the signal values obtained from each of the position detection electrode and the pressing detection electrode in different regions of a single two-dimensional coordinate system (second configuration). Furthermore, in the second configuration, the controller may detect the position the indicator from a position detection map constituted by the signal values obtained from the position detection electrode, and may set the pressing detection range which is in a pressing detection map constituted by the signal values obtained from the pressing detection electrode and includes a position corresponding to the position of the indicator (third configuration). According to this configuration, it is possible to obtain a controller 2 that is applicable to a touch panel system by simply changing the design of a controller that detects only the position of an indicator of the related art.

In any one of the first to third configurations, the controller may amplify a tentative value on the basis of the signal values in the pressing detection range to calculate the magnitude of pressing of the indicator (fourth configuration). According to this configuration, a pressing value corresponding to the magnitude of pressing of the indicator can be calculated with high accuracy.

In the fourth configuration, the controller may calculate the magnitude of pressing of the indicator by amplifying the tentative value more greatly as a contact range of the indicator becomes wider (fifth configuration). According to this configuration, it is possible to prevent a pressing value from decreasing in a case where the contact range of the indicator increases.

In the fifth configuration, the controller may calculate the magnitude of pressing of the indicator by greatly amplifying the tentative value as the number of signal values indicating a contact of the indicator increases within a position detection range including the detected position of the indicator (sixth configuration). According to this configuration, even when the contact range of the indicator has become larger, the magnitude of pressing of the indicator can be calculated with high accuracy.

Alternatively, in the fifth configuration, the controller may amplify the tentative value more greatly as the sum of the signal values indicating a contact of the indicator increases within the position detection range including the detected position of the indicator (seventh configuration). According to this configuration, it is possible to prevent the magnitude of amplification from varying due to a slight difference in one signal value, and thus the magnitude of pressing of the indicator can be accurately calculated.

In any one of the first to third configurations, the controller may adjust a tentative value based on the signal values in the pressing detection range by using an adjustment value corresponding to the position of the indicator to calculate the magnitude of pressing of the indicator (eighth configuration) . According to this configuration, even when there is a difference in pressing sensitivity in the plane of the touch panel, it is possible to reduce the difference.

In the eighth configuration, the adjustment value may be set such that a difference in the tentative value is reduced, the tentative value being obtained by pressing the indicator having a certain contact area against a plurality of locations of the touch panel with a certain force (ninth configuration). According to this configuration, it is possible to set an adjustment value that effectively reduces a difference in pressing sensitivity.

In the eighth or ninth configuration, the controller may calculate the magnitude of pressing of the indicator by amplifying the tentative value in a case where a contact range of the indicator is equal to or greater than a first switching value, and the controller may calculate the magnitude of pressing of the indicator by adjusting the tentative value using the adjustment value in a case where the contact range of the indicator is equal to or less than a second switching value smaller than the first switching value (tenth configuration). According to this configuration, even in a case where a contact range varies due to a change in the type of indicator, the pressing value can be calculated by an appropriate method according to each of the indicators before and after the variation.

Another embodiment of the present disclosure is a display device that includes the touch panel system according to any one of the first to tenth configurations and a display unit configured to display an image, the display device being configured such that the touch panel is disposed on a display surface on which the display unit displays an image (eighth configuration).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel system comprising:
a touch panel including a drive electrode, a position detection electrode, and a pressing detection electrode; and
a controller configured to impart a drive signal to the drive electrode and acquire signal values from each of the position detection electrode and the pressing detection electrode,
wherein the controller detects a position of an indicator based on the signal values obtained from the position detection electrode and calculates a magnitude of pressing of the indicator based on signal values in a pressing detection range corresponding to the detected position of the indicator among the signal values obtained from the pressing detection electrode,
the controller calculates the position of the indicator and the magnitude of pressing of the indicator based on input data, the input data being a combination of the signal values obtained from each of the position detection electrode and the pressing detection electrode in different regions of a single two-dimensional coordinate system, and
the controller detects the position of the indicator from a position detection map constituted by the signal values obtained from the position detection electrode and sets the pressing detection range, which is in a pressing detection map constituted by the signal values obtained from the pressing detection electrode and which includes a position corresponding to the position of the indicator.

2. A touch panel system according, comprising:
a touch panel including a drive electrode, a position detection electrode, and a pressing detection electrode; and
a controller configured to impart a drive signal to the drive electrode and acquire signal values from each of the position detection electrode and the pressing detection electrode,
wherein the controller detects a position of an indicator based on the signal values obtained from the position detection electrode and calculates a magnitude of pressing of the indicator based on signal values in a pressing detection range corresponding to the detected position of the indicator among the signal values obtained from the pressing detection electrode,
the controller amplifies a tentative value based on the signal values in the pressing detection range to calculate the magnitude of pressing of the indicator, and
the controller calculates the magnitude of pressing of the indicator by amplifying the tentative value more greatly as a contact range of the indicator becomes wider.

3. The touch panel system according to claim 2,
wherein the controller calculates the magnitude of pressing of the indicator by more greatly amplifying the tentative value as a number of signal values indicating a contact of the indicator increases within a position detection range including the detected position of the indicator.

4. The touch panel system according to claim 2,
wherein the controller amplifies the tentative value more greatly as a sum of signal values indicating a contact of the indicator increases within a position detection range including the detected position of the indicator to calculate the magnitude of pressing of the indicator.

5. A display device comprising:
the touch panel system according to claim 2; and
a display unit configured to display an image,
wherein the touch panel is disposed on a display surface on which the display unit displays the image.

6. A touch panel system comprising:
a touch panel including a drive electrode, a position detection electrode, and a pressing detection electrode; and
a controller configured to impart a drive signal to the drive electrode and acquire signal values from each of the position detection electrode and the pressing detection electrode,
wherein the controller detects a position of an indicator based on the signal values obtained from the position detection electrode and calculates a magnitude of pressing of the indicator based on signal values in a pressing detection range corresponding to the detected position of the indicator among the signal values obtained from the pressing detection electrode, and
the controller adjusts a tentative value based on the signal values in the pressing detection range using an adjustment value corresponding to the position of the indicator to calculate the magnitude of pressing of the indicator.

7. The touch panel system according to claim 6,
wherein the adjustment value is set such that a difference in tentative values is reduced, the tentative values being obtained by pressing the indicator having a certain contact area against a plurality of locations on the touch panel with a certain force.

8. The touch panel system according to claim 6,
wherein the controller calculates the magnitude of pressing of the indicator by amplifying the tentative value in a case where a contact range of the indicator is equal to or greater than a first switching value, and the controller calculates the magnitude of pressing of the indicator by adjusting the tentative value using the adjustment value in a case where the contact range of the indicator is equal to or less than a second switching value smaller than the first switching value.

* * * * *